Figure 5:
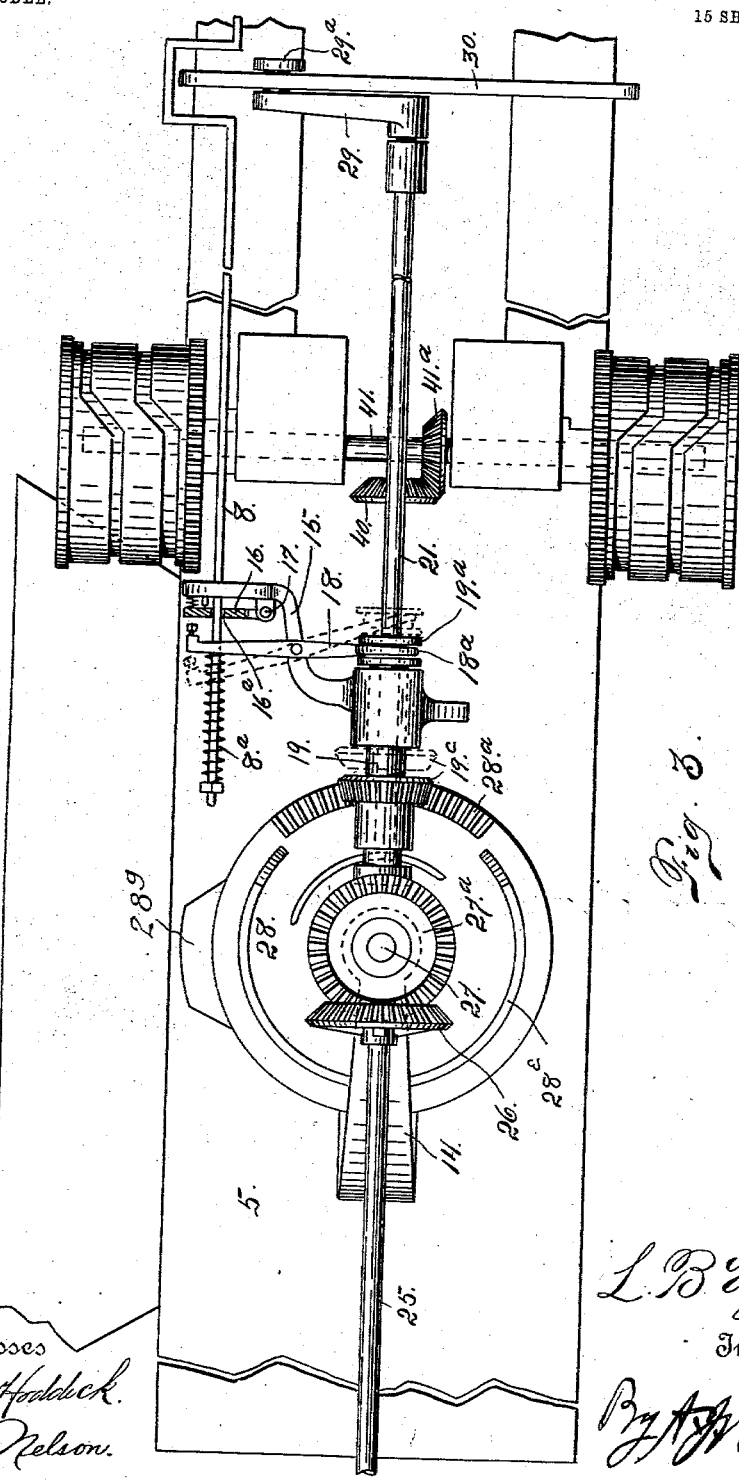

No. 743,998. PATENTED NOV. 10, 1903.
L. B. WYGANT.
KNOTTING MECHANISM.
APPLICATION FILED APR. 21, 1903.
NO MODEL. 15 SHEETS—SHEET 1.
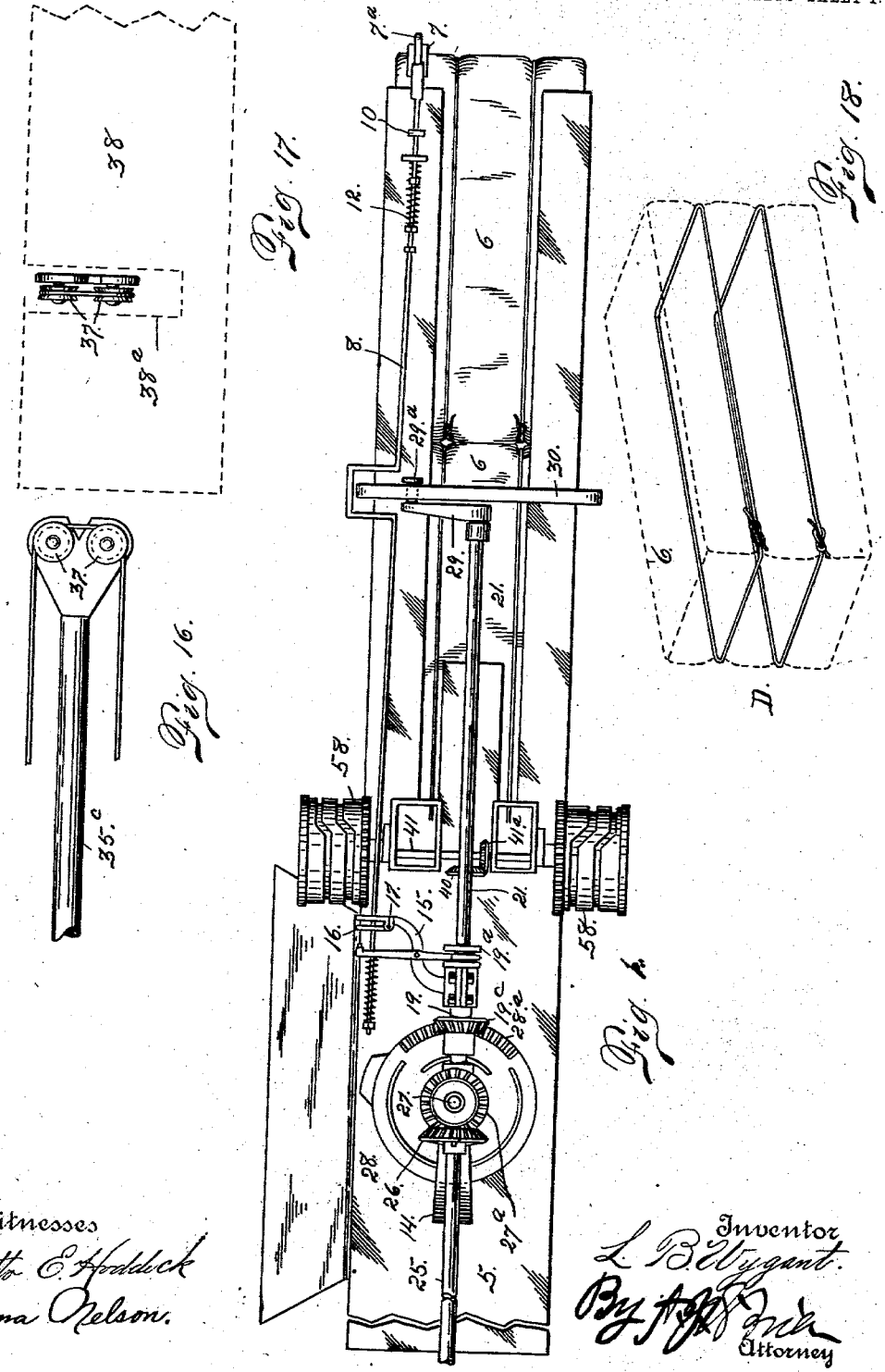
Witnesses
Otto E. Haddock
Dena Nelson.
Inventor
L. B. Wygant.
By [Attorney]

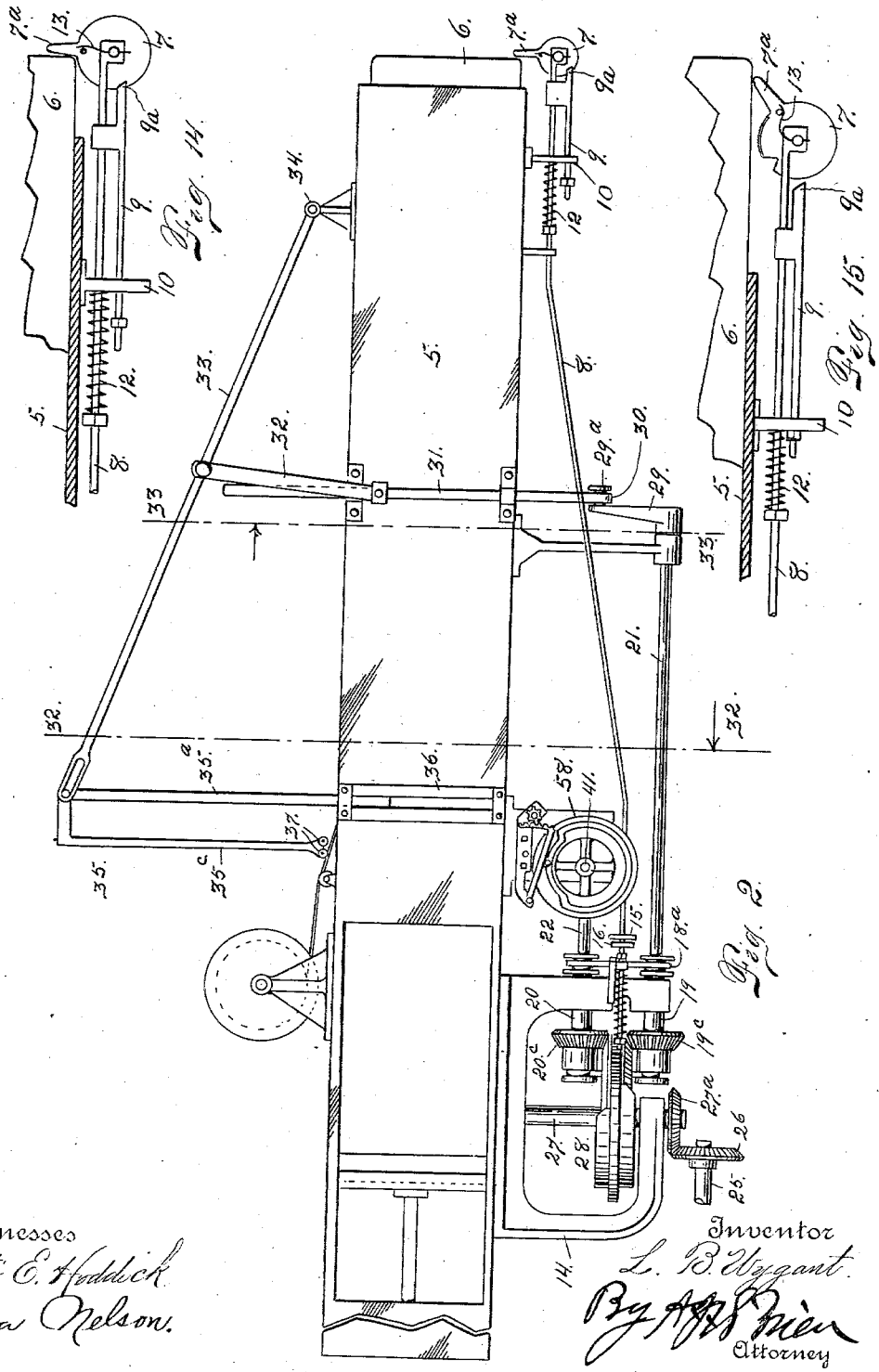

No. 743,998. PATENTED NOV. 10, 1903.
L. B. WYGANT.
KNOTTING MECHANISM.
APPLICATION FILED APR. 21, 1903.
NO MODEL. 15 SHEETS—SHEET 3.

Witnesses
Otto E. Haddick.
Dena Nelson.

L. B. Wygant.
Inventor
By
Attorney

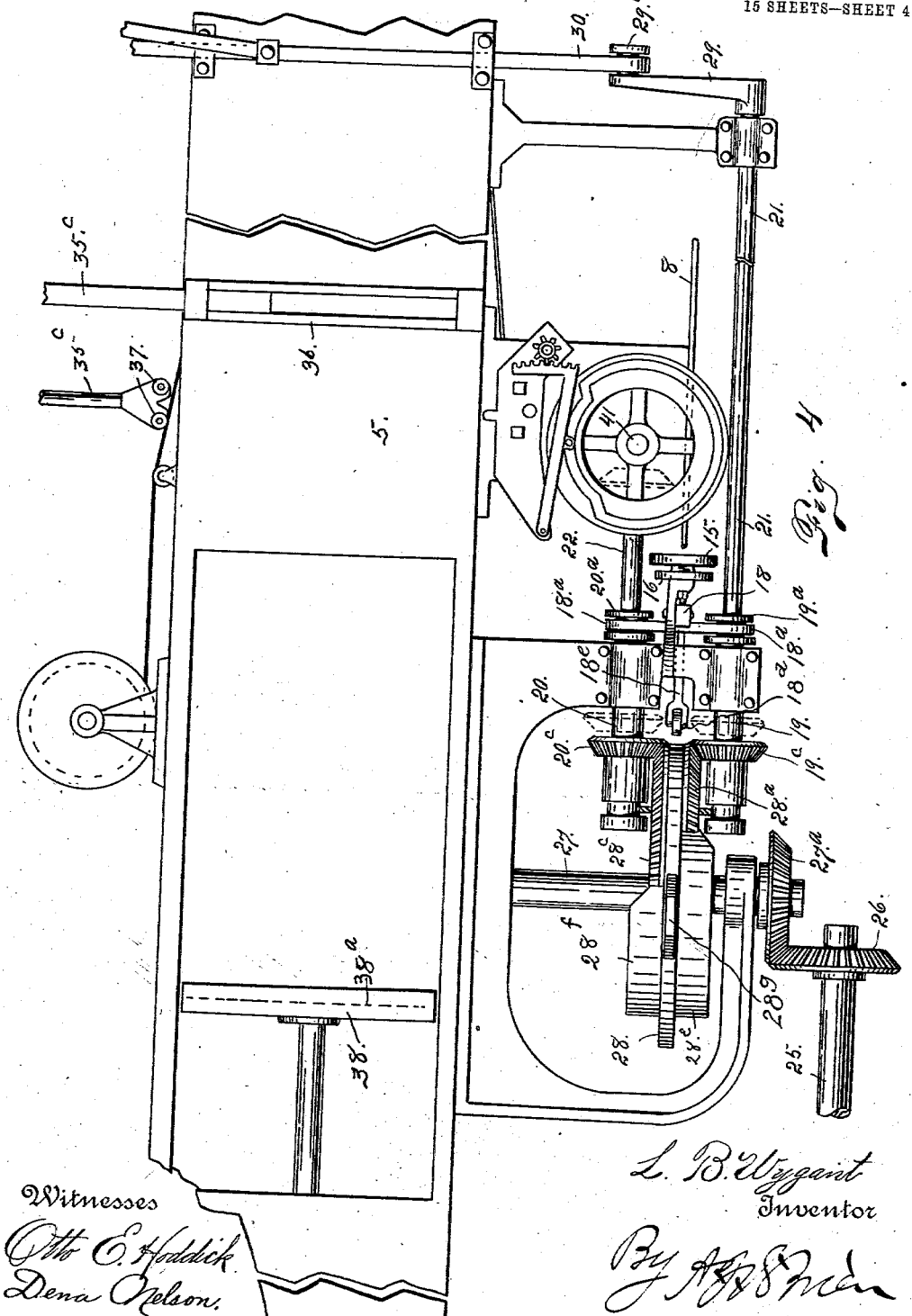

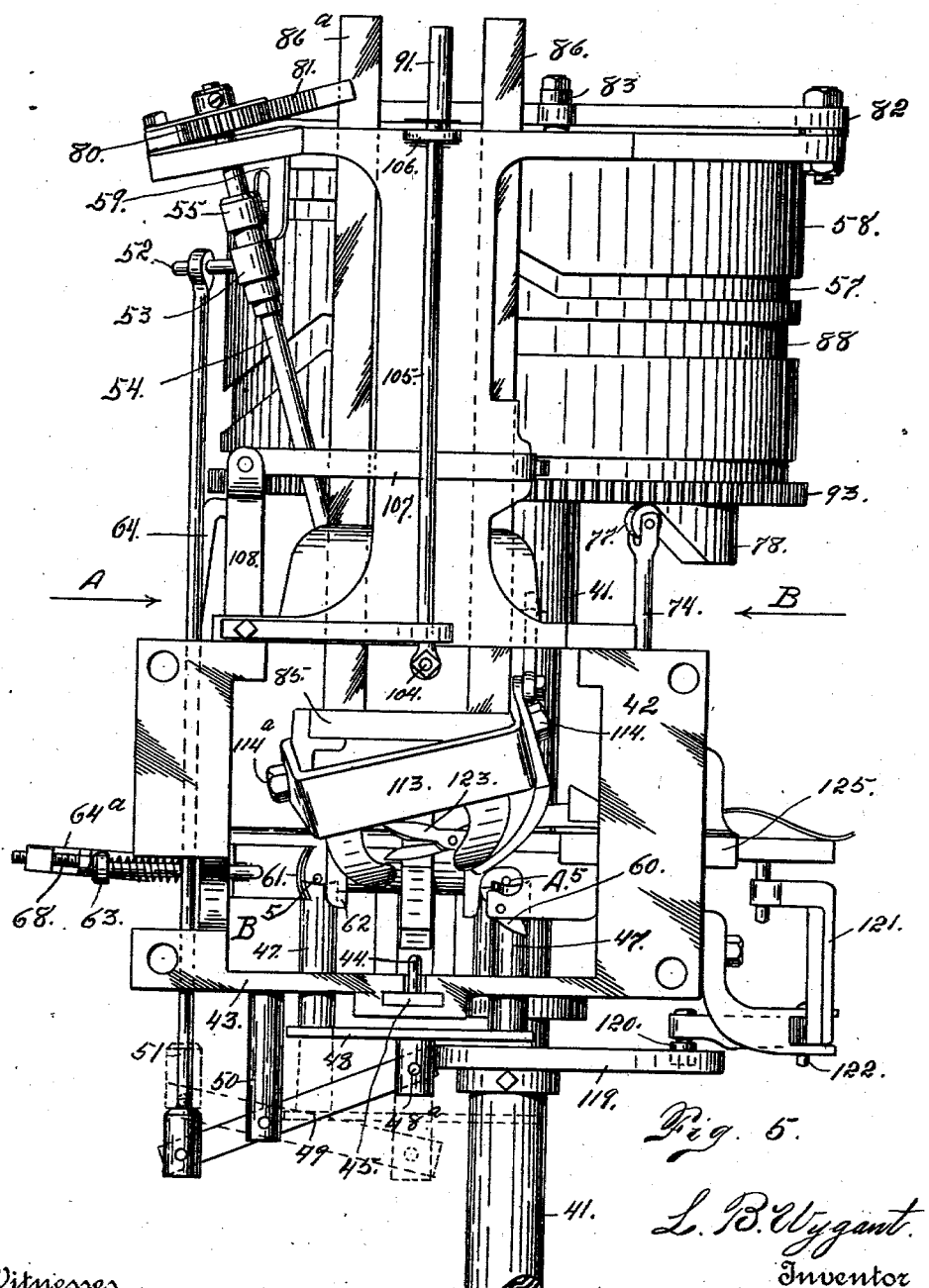

No. 743,998. PATENTED NOV. 10, 1903.
L. B. WYGANT.
KNOTTING MECHANISM.
APPLICATION FILED APR. 21, 1903.
NO MODEL. 15 SHEETS—SHEET 6.

Witnesses
Otto E. Hoddick
Dena Nelson

L. B. Wygant
Inventor

By A. P. Sorman
Attorney

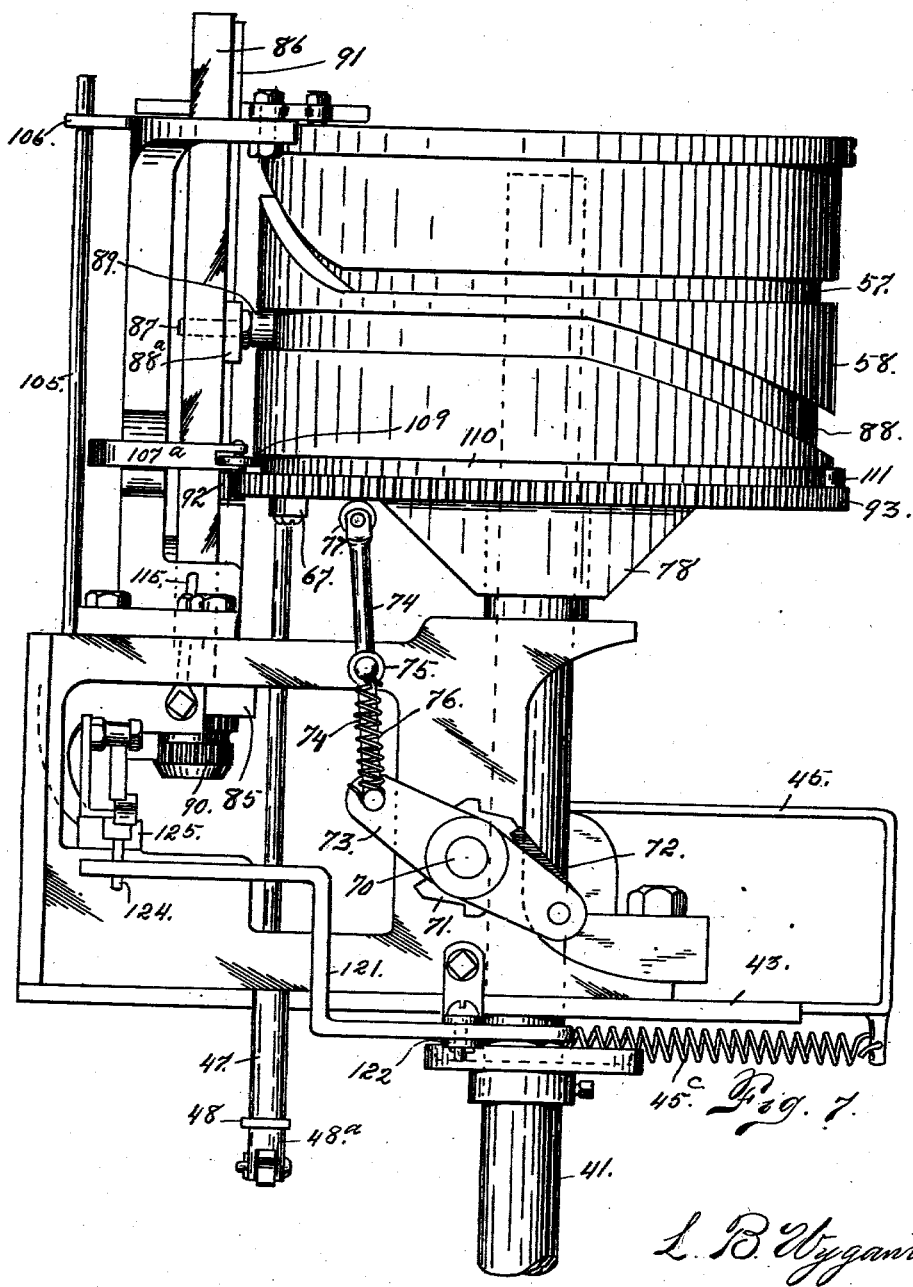

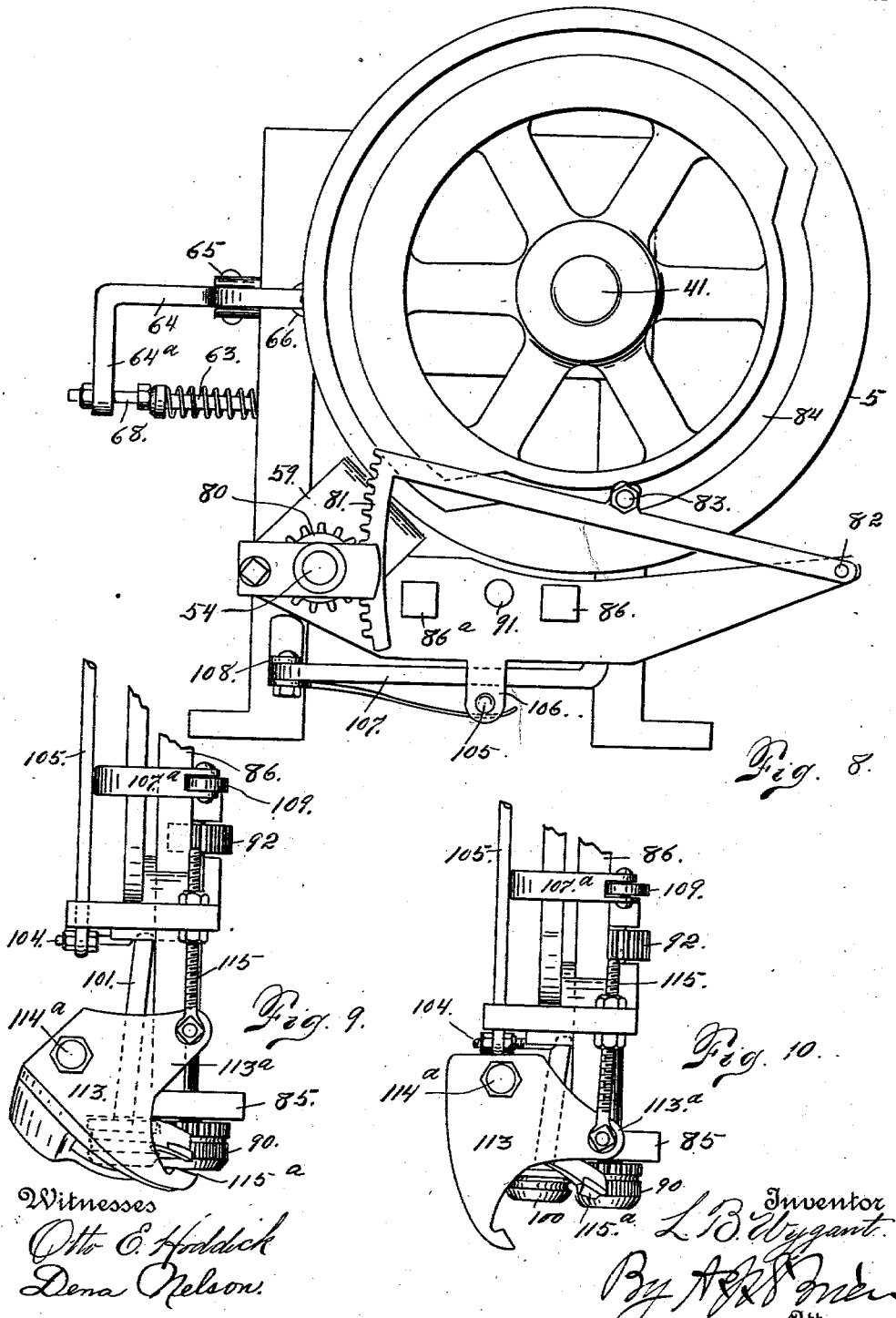

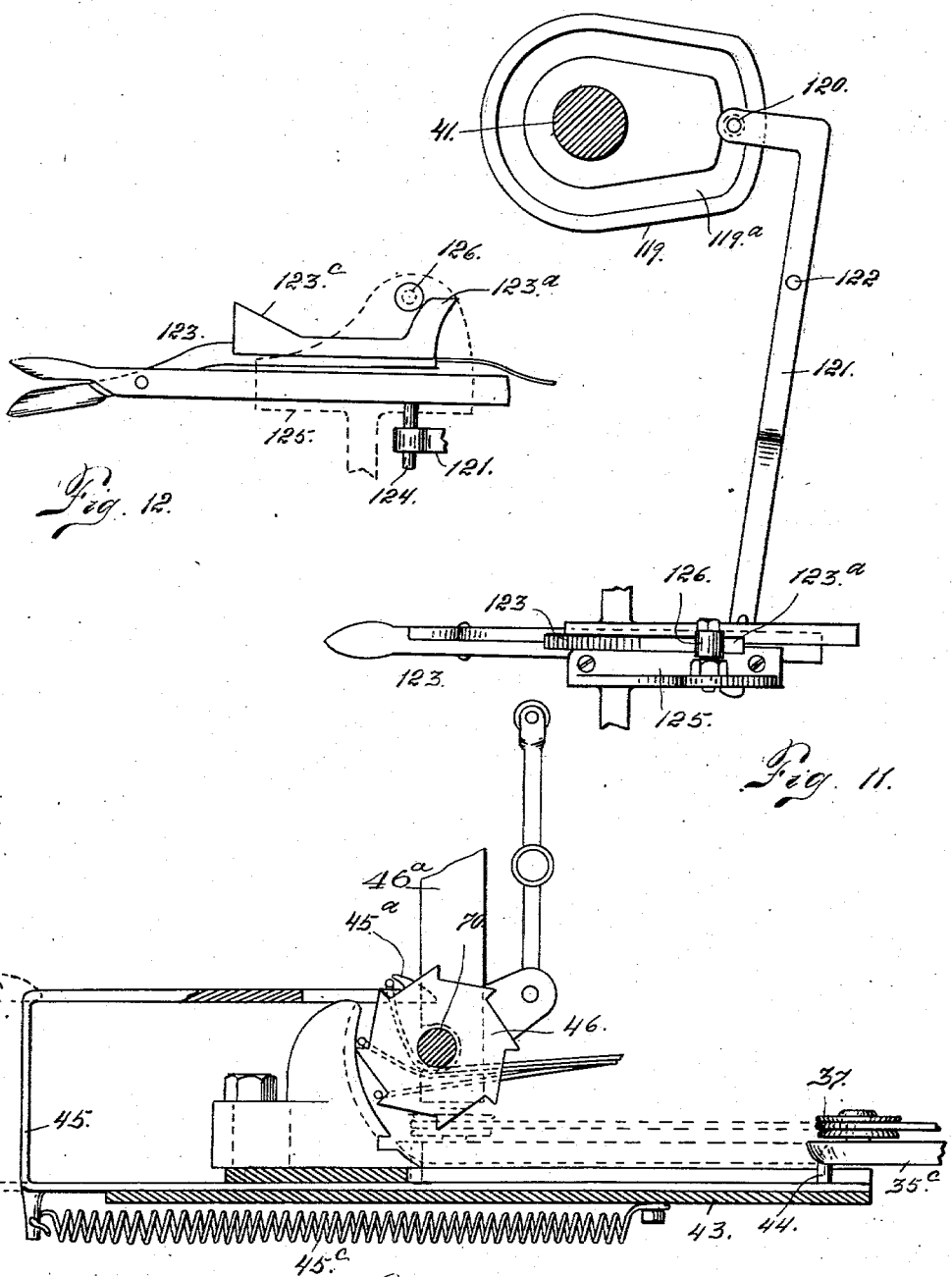

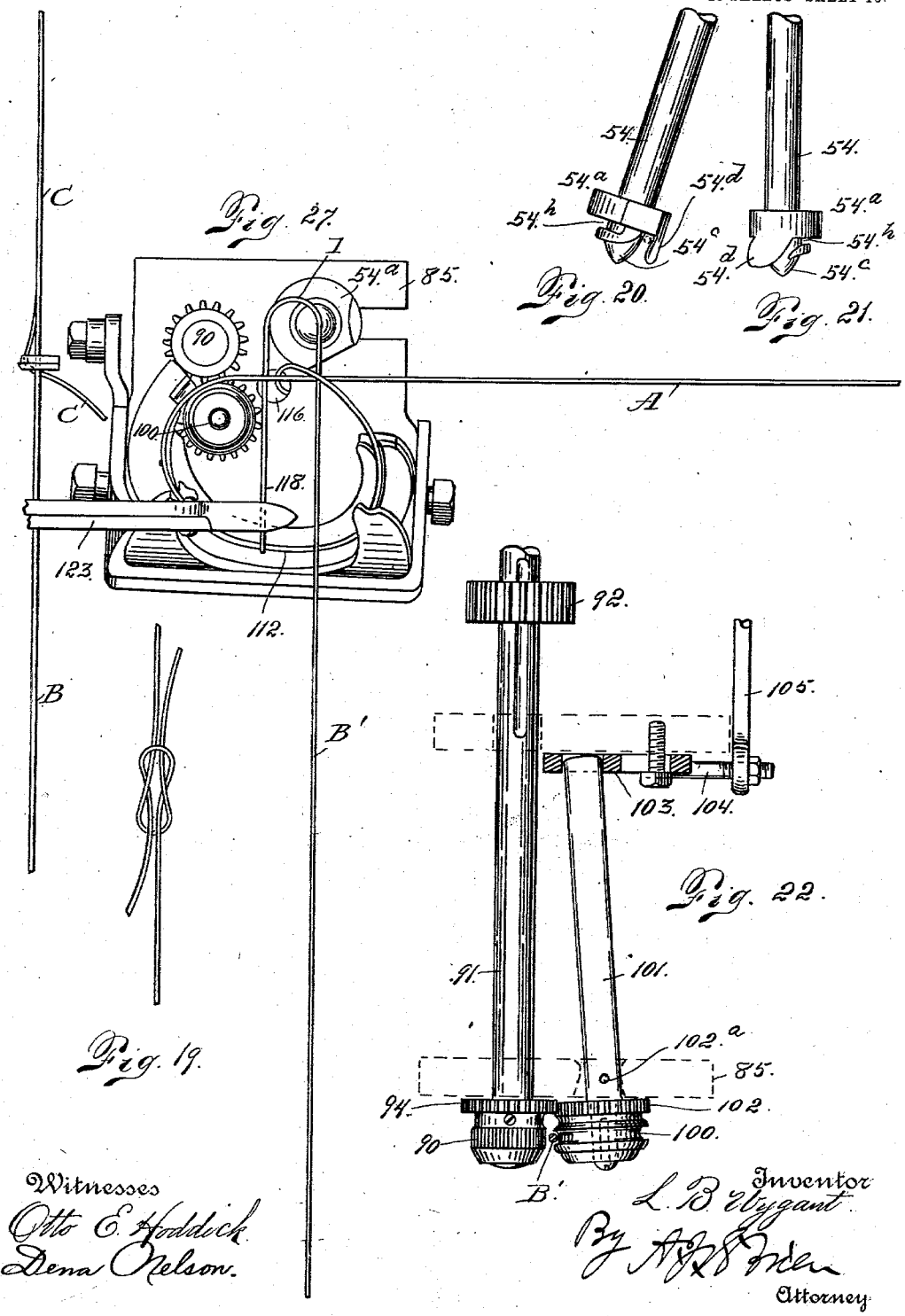

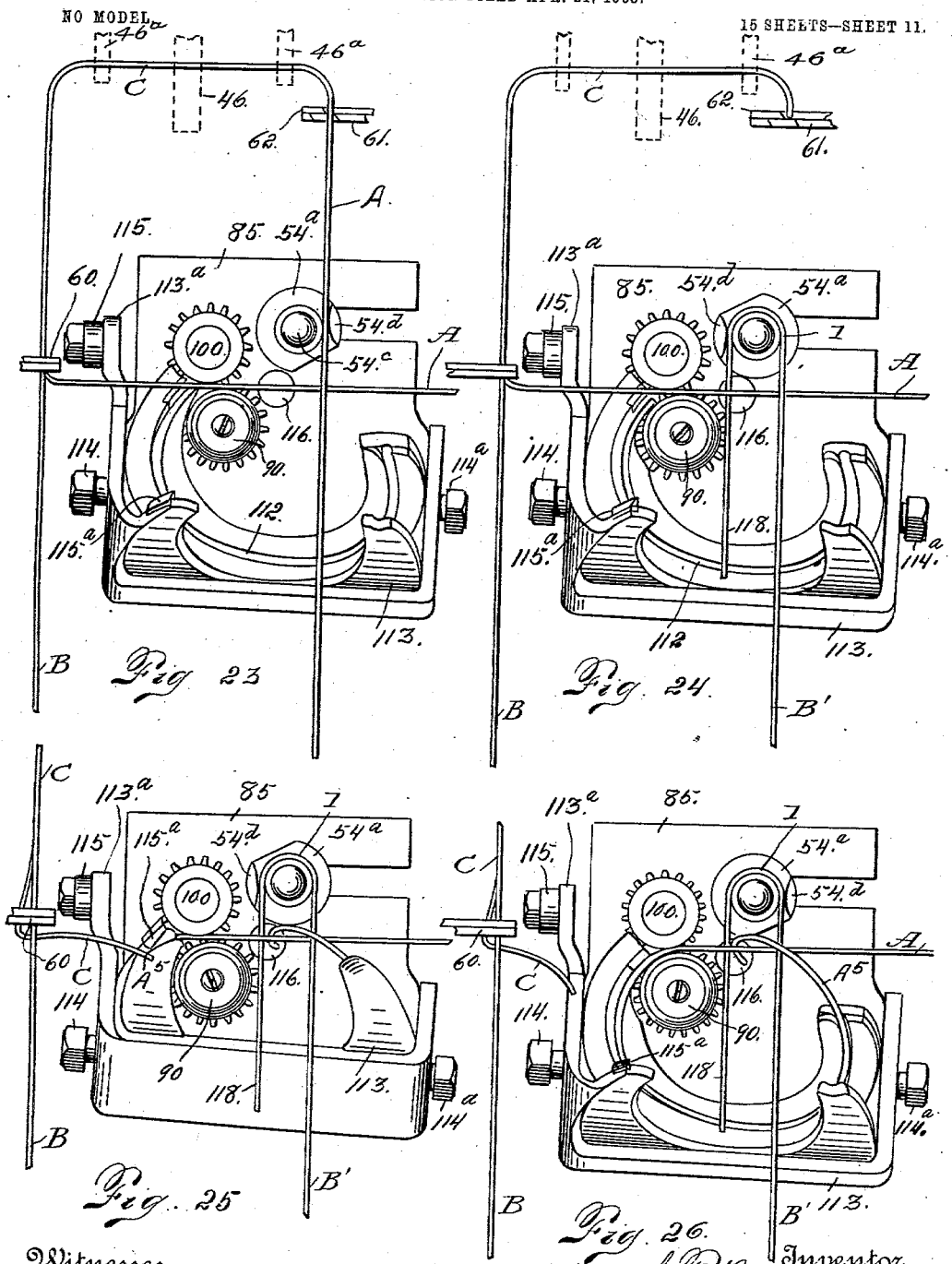

No. 743,998. PATENTED NOV. 10, 1903.
L. B. WYGANT.
KNOTTING MECHANISM.
APPLICATION FILED APR. 21, 1903.
NO MODEL. 15 SHEETS—SHEET 12.

Witnesses
Otto E. Hoddick
Dena Nelson.

Inventor
L. B. Wygant
By
Attorney

No. 743,998. PATENTED NOV. 10, 1903.
L. B. WYGANT.
KNOTTING MECHANISM.
APPLICATION FILED APR. 21, 1903.
NO MODEL. 16 SHEETS—SHEET 13.

No. 743,998. PATENTED NOV. 10, 1903.
L. B. WYGANT.
KNOTTING MECHANISM.
APPLICATION FILED APR. 21, 1903.
NO MODEL. 15 SHEETS—SHEET 14.

Witnesses
Otto E. Hoddick.
Dena Nelson.

L. B. Wygant.
Inventor
By A. ...
Attorney

No. 743,998. PATENTED NOV. 10, 1903.
L. B. WYGANT.
KNOTTING MECHANISM.
APPLICATION FILED APR. 21, 1903.
NO MODEL. 15 SHEETS—SHEET 15.
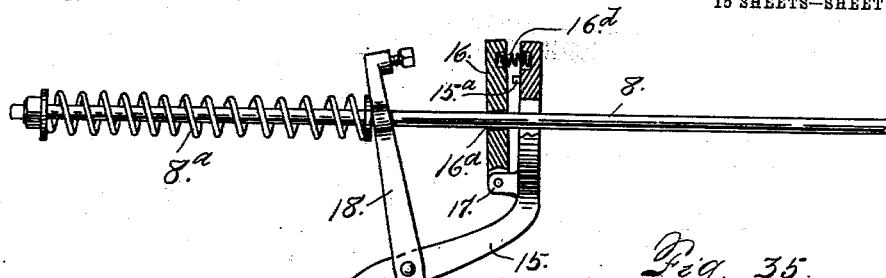
Fig. 35.
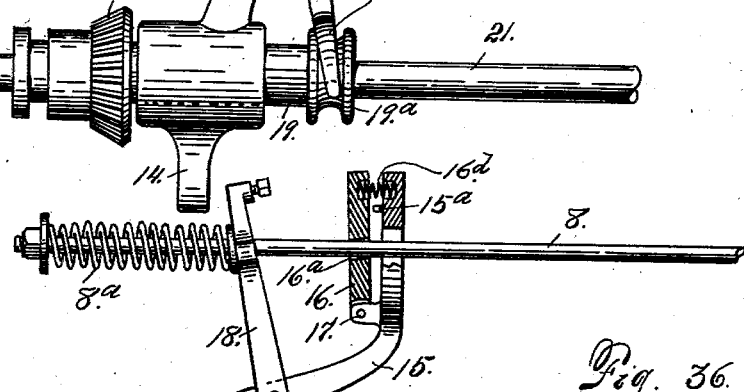
Fig. 36.
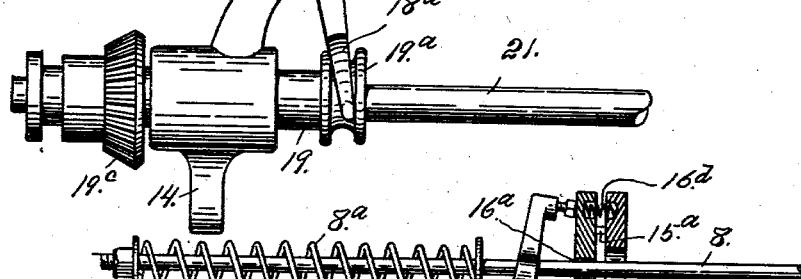
Fig. 37.
Witnesses
Otto E. Haddick.
Dena Nelson.
L. B. Wygant.
Inventor
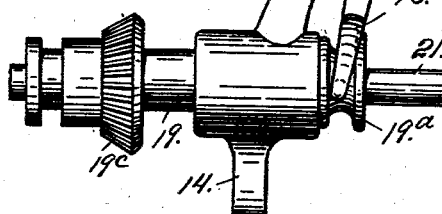
Attorney No. 743,998.

Patented November 10, 1903.

UNITED STATES PATENT OFFICE.

LEWIS B. WYGANT, OF DENVER, COLORADO.

KNOTTING MECHANISM.

SPECIFICATION forming part of Letters Patent No. 743,998, dated November 10, 1903.

Application filed April 21, 1903. Serial No. 153,687. (No model.)

*To all whom it may concern:*

Be it known that I, LEWIS B. WYGANT, a citizen of the United States of America, residing at the city and county of Denver and State of Colorado, have invented certain new and useful Improvements in Knotting Mechanism; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in knotters or knotting mechanism adapted for use in connection with self-tying baling-presses, in which connection it will be explained in this specification, though it must be understood that it is equally well adapted for use in other relations where an automatic knotting device is required. In this specification the knotter proper will be described in connection with means for automatically feeding wire to the press and in connection with a transmission device whereby the knot-tying mechanism is automatically controlled, the transmission device being in turn set in motion by the completed bales as they are moved forward by the plunger of the press.

The knotter proper consists of means for cutting the baling-wire and securely tying its ends together after it has been passed around the bales.

Having briefly outlined my improved device as it will be set forth in this specification, I will proceed to describe the same in detail, reference being made to the accompanying drawings, in which is illustrated an embodiment thereof.

Figure 6:
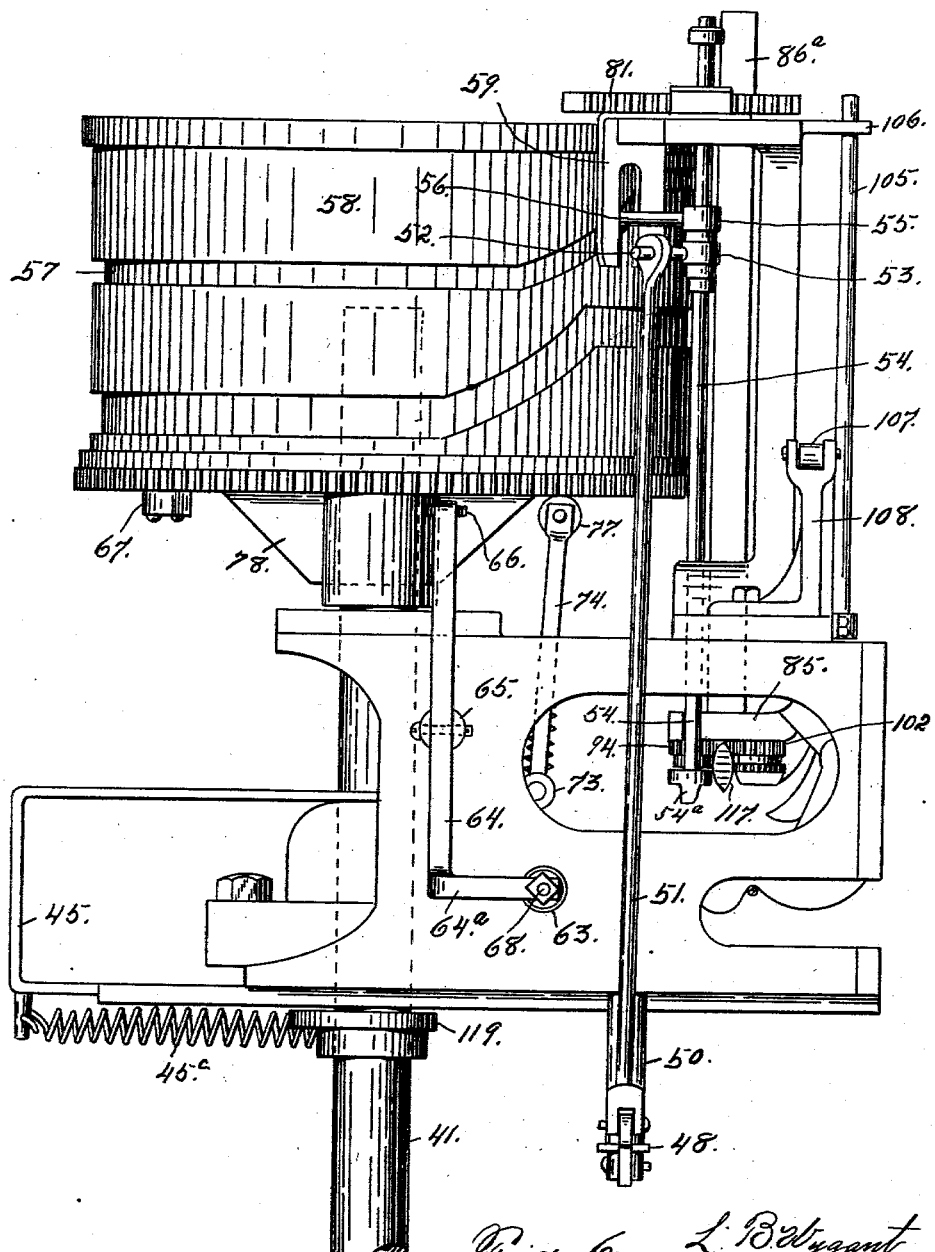
Figure 28:
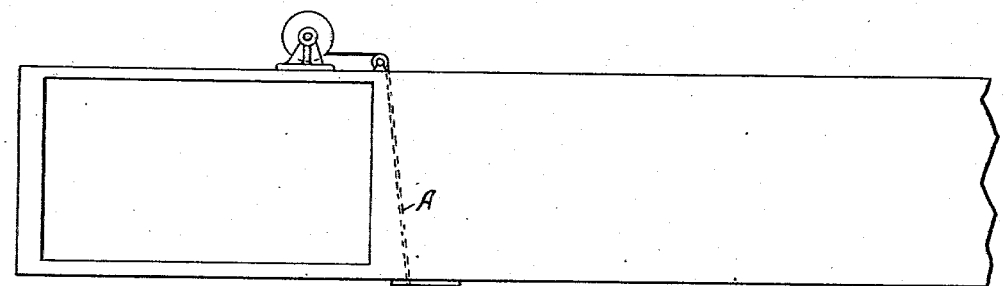
Figure 29:
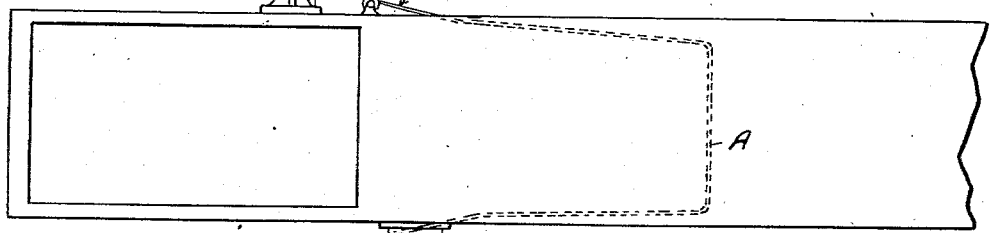
Figure 30:
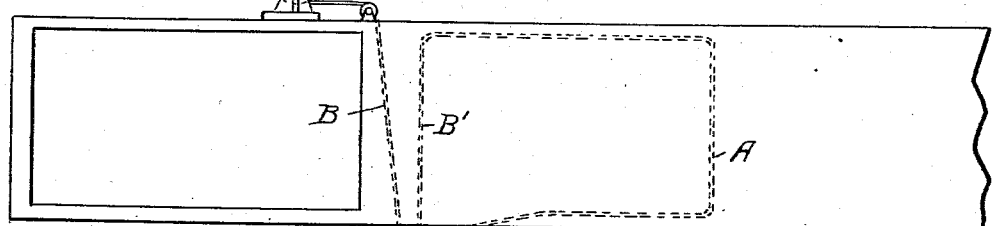
Figure 31:
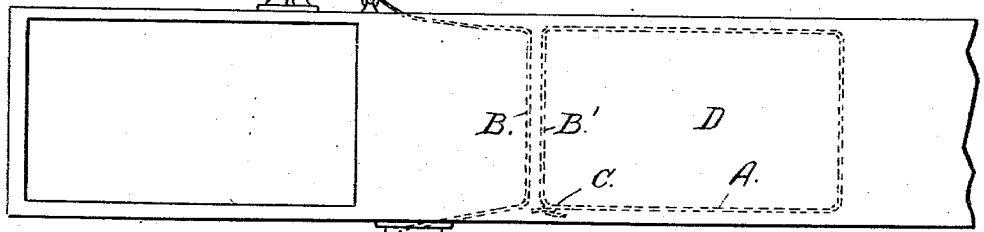
Figure 32:
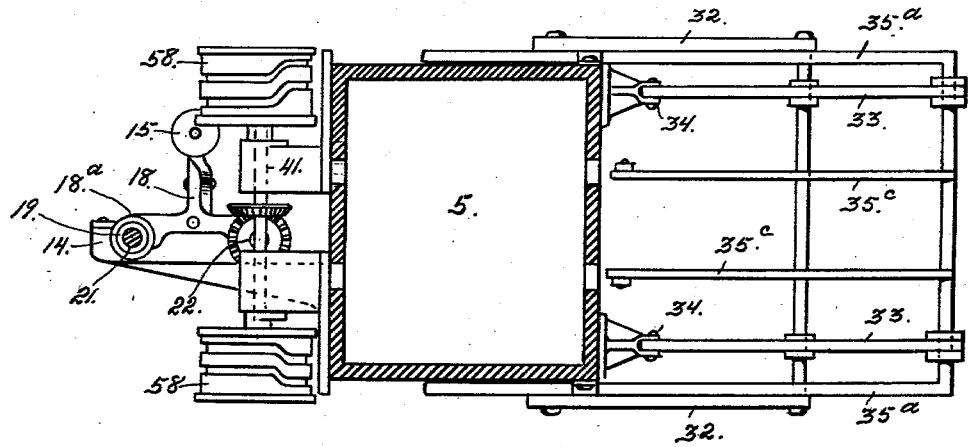
Figure 33:
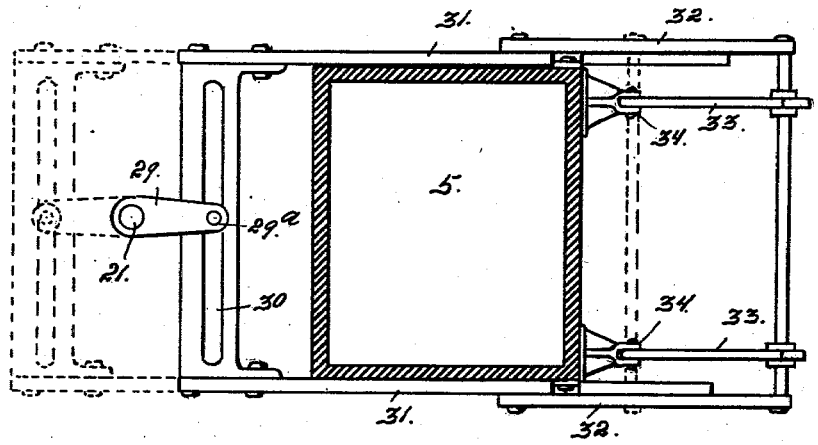
Figure 34:
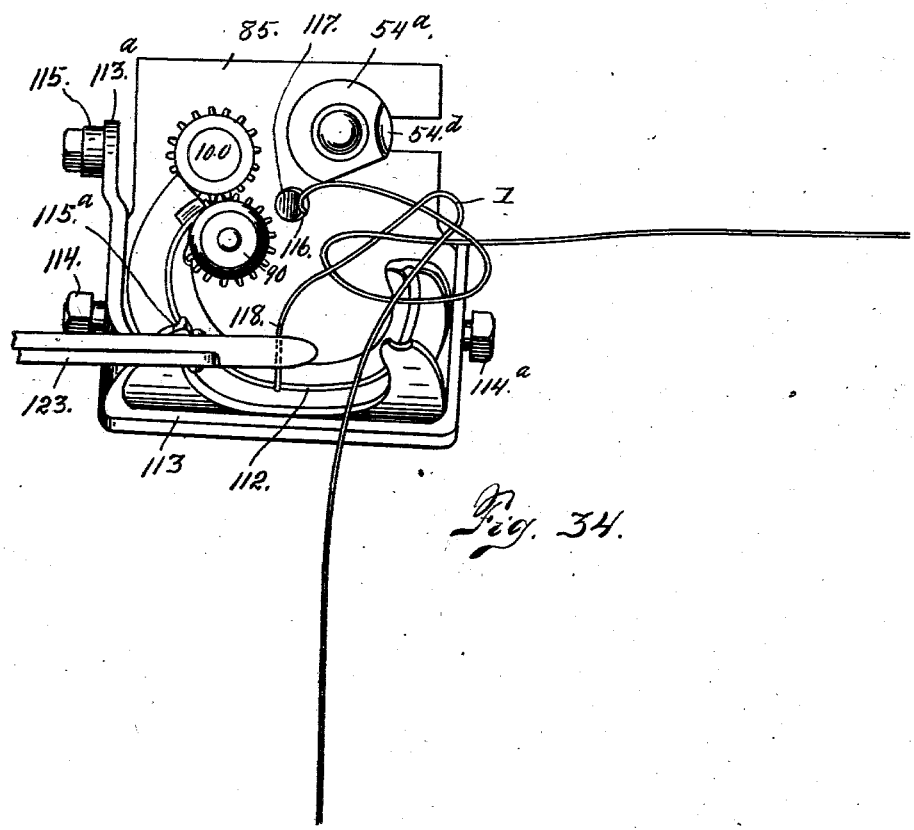

In the drawings, Figure 1 is a detail side elevation of a baling-press equipped with my improvement. Fig. 2 is a top or plan view of the same. Fig. 3 is an enlarged side elevation of the transmission-gear, showing its relation with the automatic knotter. Fig. 4 is a top or plan view of the same. Fig. 5 is a detail inner face view of the automatic knotter, shown in elevation. Fig. 6 is a detail side elevation of the knotter looking in the direction of the arrow A in Fig. 5. Fig. 7 is a detail side elevation of the knotter looking in the direction of the arrow B in Fig. 5. Fig. 8 is a top plan view of the knotter. Fig. 9 is a detail view of what is herein termed the "knotter-head" in its closed position. Fig. 10 is a detail view showing the knotter-head in its open position. Fig. 11 is a detail view showing the cam mechanism employed for automatically operating the pliers used for holding one of the ends of the wire until the knot is drawn taut. Fig. 12 is a detail view of the pliers, shown in elevation. Fig. 13 is a detail view showing the manner in which the wire enters the knotter and is retained for cutting or tying. Figs. 14 and 15 are detail views showing the mechanism for automatically operating the transmission-gear. Fig. 16 is a detail view of the wire-carrying plunger. Fig. 17 is an end view of the same and shown as resting in the recess formed in the baling-press plunger, which is indicated by dotted lines. Fig. 18 is a perspective view of a bale, which is indicated by dotted lines, showing the wires tied in accordance with my invention. Fig. 19 is a detail view showing the form of knot tied by my invention. Figs. 20 and 21 are two detail views of the wire-engaging spindle with which the first loop is formed in tying the knot. Fig. 22 is a detail view of the feed-rollers between which the wire is fed to a groove. These rollers are instrumental in producing the second loop in tying the knot. Figs. 23 to 27, inclusive, are detail bottom face views of the knotter-head, illustrating the various steps in the operation of tying a knot. Fig. 28 shows the initial position of the wire, as at A, leading from the reel extending through the press and having its end secured in the knotter. Fig. 29 shows the next step in the operation, in which the wire A has been forced forwardly by the compressed material which is to be formed into a bale. Fig. 30 shows the wire extending entirely around the compressed material. This result is attained by a wire-carrying plunger which engages the wire at the point A' of Fig. 29, drawing the double strand of wire B B' through the press, where it is secured in the knotter. Fig. 31 shows the finished bale and the starting of the next one, in which the knotter has been operated, cutting the strand B' from the loop B B' and tying the knot, as at C, the strand B being thrown forward by the compressed material the same as A in Fig. 29. Fig. 32 is a cross-section taken through the baling-press on the line 32 32 of Fig. 2 with parts shown in full. This view is taken in the direction of the arrow; but the parts 32, 33, and 34 are viewed from a position farther to the right. Fig. 33 is a cross-section taken on the line 33 33 of Fig. 2, showing the crank-and-link arrangement for operating the wire-carrying plungers. This view is looking toward the right or in the direction opposite Fig. 32. Fig. 34 is a bottom face view of the knotter-head, showing the completed knot as it is being drawn taut by the expansive reaction of the compressed hay and just before the loose ends are released. Fig. 35 is an enlarged detail view showing the automatic connection between the knotting mechanism and the transmission-gear. Fig. 36 is a similar view showing the parts under tension resulting from the forward motion of the operating-rod. Fig. 37 is a similar view showing the parts in position for transmitting motion.

The same reference characters indicate the same parts in all the views.

Let the numeral 5 designate the baling-press, the body portion of which may be of any well-known construction, nothing being claimed in this application upon the baling-press proper, but only on the attachment hereinafter described for automatically placing the wires around the bale or other package or bundle and tying them together.

At the mouth of the press 5 is mounted a trip mechanism which includes a projecting arm $7^a$ integral with a disk 7. This disk 7 is connected with the end of a spring-pressed rod 8, which passes through a hanger or bracket 10, fast on the press. A rod 9, slidably mounted on the rod 8, also passes through the bracket 10 and engages a notch cut in the disk 7 until the disk is withdrawn from the rod 9 by the travel of the bale in leaving the press. Detail views of this mechanism are shown in Figs. 14 and 15, in which it will be seen that the bale in leaving the press travels against the arm $7^a$, which moves with it until its disk 7 is carried out of engagement with the end portion of $9^a$. The rod or dog 9 when the disk is permitted to turn to the position shown in Fig. 15 and when released by the removal of the bale will return to its normal position, as shown in Fig. 14, by the action of the springs 12 and 13. The transmission-gear is actuated by the reciprocation of this rod 8, as seen in Figs. 1, 2, 3, and 4, in which 14 is the frame in which the transmission-gear is mounted. The rear end of the rod 8 passes through the upper end of an arm 15, projecting from the frame 14. This arm 15 is provided with a disk 16, pivoted at a point 17 and provided with an opening $16^a$, through which the rod 8 loosely passes. (See Fig. 3.) Also mounted on the arm 15 is a pivoted lever 18. The rod 8 passes loosely through the upper end of this lever and has a spiral spring $8^a$ fitted over its protruding end. The lower end of the lever 18 is bifurcated to form a yoke $18^a$, which engages the sliding collars $19^a$ and $20^a$ of the sleeves 19 and 20, which are mounted on the shafts 21 and 22, respectively. (See Fig. 4.) The lever 18 is normally in the position shown by dotted lines in Fig. 3 and in full lines in Figs. 35 and 36. As the rod 8 is drawn forward by means of the trip mechanism above described the tension of the spring $8^a$ is exerted against the upper end of the lever 18, (see Fig. 36,) and the rod 8 is held against a return movement by the locking-disk 16. 25 is the power-shaft by means of which motion is imparted to the transmission-gear through the bevel-gear 26, which engages a bevel-gear $27^a$ on the shaft 27, mounted in the frame 14.

Mounted on the shaft 27 is a wheel 28, as seen in Figs. 3 and 4. This wheel 28 consists of a series of segmental gears, guides, and stops and is so mounted as to project between the sleeves 19 and 20. Mounted on the sleeves 19 and 20 and within the frame 14 are the bevel-gears $19^c$ and $20^c$, respectively. These gears $19^c$ and $20^c$ are normally in the position shown by dotted lines in Fig. 4, but when acted on by the tension of the spring $8^a$ through the lever 18 will be carried into engagement with the segmental gears $28^a$ and $28^c$. The guides and stops of the wheel 28 are so arranged as to permit the gears $19^c$ and $20^c$ to engage the wheel 28 at a given point only, so as to time every operation in relation to the travel of the baling-press plunger. The segmental gears $28^a$ and $28^c$ turn their respective gears $19^c$ and $20^c$ one revolution, when their further travel is prevented by the stops $28^e$ and $28^f$, the gear $19^c$ being caused to travel one-half of a revolution ahead of the gear $20^c$.

As seen in Figs. 35, 36, and 37, the rod 8 when in its normal position rests as shown in Fig. 35, and when drawn forward by the trip-lever as a completed bale is expelled from the press, as above described, the tension of the spring $8^a$ is exerted against the upper end of the lever 18, and as the bale is removed the rod 8 is prevented from returning to its normal position by the plate 16, (see Fig. 36,) which is slightly tilted on its pivot-point by the spring $16^d$, binding the rod against a return movement by its closely-fitting orifice $16^a$. When the stops on the wheel 28 permit the gear $19^c$ to enter into engagement with its segmental gear $28^a$, a tension exerted on the lever 18 (see Fig. 36) will throw the gear $19^c$ into engagement through its yoked portion $18^a$, which engages the collar $19^a$, mounted on the sleeve 19, with the gear $19^c$, and as the upper end of the lever 18 reaches its forward stroke, as shown in Fig. 37, it engages the plate 16, carrying it to a vertical position against the stop $15^a$, thus permitting the rod 8 to pass freely through the said plate to its normal position. To return the gears $19^c$ and $20^c$ to their normal position, I have provided the projecting lug $28^g$, (see Figs. 3 and 4,) which, after the gears 19$^c$ and 20$^c$ have performed their function, engages a small roller 18$^d$, (see Fig. 4,) which is mounted in the end of a sliding rod 18$^c$ and is connected to the engaging yoke 18$^a$ of the lever 18.

The gear 19$^c$ on the sleeve 19, which is mounted on the shaft 21, causes said shaft to revolve with it. Secured to the opposite end of the shaft 21 is a crank-arm 29, the pin 29$^a$ of which engages a slotted cross-head 30, (see Fig. 33,) provided with guide-arms 31, which extend both above and below the baling-chamber. Links 32 (see Figs. 2, 32, and 33) connect these arms 31 with pivoted arms 33. The arms 33 are pivoted at their forward ends to bearings 34 and have secured to their traveling ends the wire-carrying plungers 35. These plungers 35 consist of guide-arms 35$^a$ and plunger-arms 35$^c$. These guide-arms 35$^a$ travel in ways 36, mounted on the top and bottom of the press, respectively. Mounted at the free ends of the arms 35$^c$ are the sheaves or antifriction-wheels 37, over which the wire travels as it is carried through the press. In this manner the baling-wire is passed through the press and into the automatic knotter as the shaft 21 and the connecting-gear and crank are turned one-half of a revolution. The operation of the wire-carrying plungers is also timed by the transmission-gear in such a manner as to have the wire pass through the press as the hay-press plunger reaches the limit of its stroke. Transverse grooves 38$^a$ are cut in the plunger-head 38 (see Fig. 17) to form passages between the pressed material and plunger-head for the free travel of the wire-carrying plungers. As the shaft 21 completes its revolution the plunger 35 is withdrawn from the press and returns to its normal position. Just as the shaft 21 has traveled one-half of a revolution, feeding the wire through the press and into the knotter, the bevel-gear 20$^c$ engages the transmission-gear and the gear 20$^c$ carries the shaft 22 with it and actuates the automatic knotter through the instrumentality of the bevel-gear 40, which engages the gear 41$^a$ on the shaft 41.

As shown in Figs. 1 to 4, I have equipped the present press with two knotters, a separate knotter being required for each band of wire employed to hold the bale. Should it be desired to secure the bale by three or four bands, a corresponding number of knotters would be employed. These knotters or knot-tying mechanisms are mounted upon and actuated by the shaft 41 and are so arranged as to complete their respective operations by one revolution of the said shaft. In Figs. 5, 6, 7, and 8 are shown an inner face view, two side elevations, and a top or plan view, respectively, of one of the knotters employed. These knotters consist of a combination of mechanical devices actuated by a series of cams and gearing mounted on the shaft 41.

I will now proceed to describe in detail the mechanical movements of a single knotter or knotting mechanism as nearly as possible in the order of their occurrence.

The wire-carrying plunger, as above described, after passing through the hay-press enters the knotter 42 just above its base plate or floor 43, and on entering the knotter engages a pin 44, (see Figs. 5 and 13,) which is secured to a slotted yoke 45, arranged to extract previously-cut waste ends from the knotter. The plunger 35 continues to travel into the base of the knotter until its end carrying the wire loop passing over the sheaves 37 reaches the position under the toothed wheel 46, as shown in dotted lines in Fig. 13. The plunger 35 now recedes from the knotter, and the looped wire, remaining in the knotter, is raised to engagement with the toothed wheel 46. The looped wire to reach the position just named passes under two stationary posts 46$^a$, which serve to retain the loop in its open position and in alinement for cutting and other manipulation. To raise this looped wire into position, I have provided two reciprocating vertical posts 47 47. (See Fig. 5.) These posts 47 are rigidly secured to the cross-piece 48, which is pivoted to a lever 49, engaging a central pivot-pin 48$^a$. This lever 49 is mounted on a rigid post 50 and has pivoted to its outer end the operating-rod 51. This rod is in turn actuated by a short pin 52, secured to its upper end, and which engages a loose collar 53, mounted on a rod 54. This last-named rod or spindle is placed at a slight angle from a vertical position, and its lower end is provided with means for engaging and bending the wire, as hereinafter described. A second collar 55 is mounted at the upper end of the rod 54, from which a short pin 56 projects into a cam-groove 57, arranged in the cylindrical surface of the drum 58. The pin 56 is held from radial movement by the slotted bracket 59, through which it passes before entering the cam-groove 57. As the looped end of the wire is raised in the knotter, as above described, and engages the toothed wheel 46 one of its strands (designated A$^5$ in Fig. 5) is brought into engagement with a retaining-dog 60 (see Fig. 5) and its other strand B$^5$ into the path of the cutting-blade 61. The wire, resting between this blade 61 and a stop 62, is cut at this point. The cutting-blade 61 is mounted on a spring-pressed pin 63 and arranged to operate as follows: The pin 63 protrudes through the side wall of the knotter, where it is acted upon by a pivoted lever 64. This lever (see Fig. 6) is pivoted at a point 65 and has a friction-wheel 66 pivoted on its upper free end, which projects to a point under the drum 58 and into the path of a short lug or wedge 67 thereon, thus causing the upper end to move outwardly as the wedge 67 passes it. The lower portion of this lever 64 is bent, as shown at 64$^a$, in order to have its end rest against the spring-pressed pin 63, and as it is caused to travel inwardly to correspond with the outward movement of its upper end it will carry the pin 63 and its blade 61 with it, cutting the wire. An adjusting-screw 68 is threaded into the lower end of the lever 64, by means of which its travel may be regulated. A short piece of waste wire, comprising the end of the loop formed by the wire-feeding plunger 35, is cut away in tying each knot. As the wire is cut for the first time, as above described, the end projecting toward the waste loop is carried up by the toothed wheel 46, which is arranged to operate as follows: This toothed wheel is mounted on a shaft 70, which extends through the knotter and is mounted in its side walls. At one end of the shaft 70 (see Fig. 7) is rigidly mounted a ratchet-wheel 71, which is engaged by a pawl or dog 72, mounted on a lever 73, the latter being loosely pivoted on the shaft 70. Pivoted to the upper or opposite end of the lever 73 is a vertical rod 74, which extends to a point under the drum 58 and into the path of a downwardly-projecting lug or wedge 78. The rod 74 passes loosely through a projecting pin or stud 75. This rod 74 and the lever 73 are held normally in their upward position, as shown in Fig. 7, by a spiral spring 76, the lower extremity of which is secured to the lever 73 and the upper end to a stud 75, fast on the frame of the machine. In the upper end of the rod 74 is mounted a friction-roller 77, and as the downwardly-projecting wedge 78 passes over the roller 77 its rod 74 is forced downwardly, turning the lever 73 and its ratchet 72 a sufficient distance to cause the ratchet and the shaft 70 to be turned a distance of one tooth. In this manner the waste looped wire is carried up and around the toothed wheel 46, where it is removed from the knotter by the extracting-yoke 45, actuated by the engagement of the plunger 35 with the pin 44, as above described.

The rod 54, above referred to, has arranged at its lower end a button 54$^a$ for engaging and bending the end of the wire cut from the waste loop just described and is arranged as follows: The button end 54$^a$ is provided with a tapering center 54$^c$, a depending lip 54$^d$, and a spiral groove 54$^h$, details of which are shown in Figs. 20 and 21. The rod 54 has a reciprocating vertical movement similar to the rod 51, with which it is connected, both being actuated by the pin 56, which engages the cam-groove 57, as above described. The button 54$^a$ engages the wire when in the position shown in Figs. 20 and 23 and turns the wire into the loop designated 1, as shown in Figs. 24, 25, 26, and 27 and illustrated in Fig. 5, by one half-turn of the rod 54. The half-turn is given to the said rod or spindle by a pinion 80 and a segment-gear 81. The said pinion is keyed to the upper end of the spindle in such a manner as to turn with it and at the same time permit vertical play of the spindle. This pinion meshes with a segment-gear 81, pivoted at its opposite end, as at 82, and provided with a pin 83. This last-named pin projects into a cam-groove 84, cut in the upper surface of the drum 58.

The mechanism just described forms the first loop of the knot to be tied. The second loop, which completes the knot, is formed from the strand of wire passed around the bale and is accomplished as follows: The mechanism for producing the second loop is mostly mounted on a plate 85, which is herein termed the "knotter-head." This knotter-head is secured to the lower end of the vertical sliding posts 86 and 86$^a$ (see Fig. 5) and is caused to reciprocate by reason of the pin 87, which is secured to a cross-piece 88$^a$, connecting the posts 86 and 86$^a$. This pin 87 projects into a cam-groove 88, cut in the cylindrical surface of the drum 58. An antifriction-sleeve 89 is fitted over the pin 87. The remaining strand of wire, at the end of which the second loop of the knot is formed, extends across the knotter-head, as shown in the under-surface view of said knotter-head, (see Fig. 24,) and as the knotter-head is carried downwardly by the sliding posts 86 and 86$^a$, as above described, the wire rests between the rollers 90 and 100. These rollers receive their motion as shown in Figs. 7 and 22. The roller 90 is mounted on a shaft 91, which extends up through the knotter-head and has its bearing in the frame of the knotter. A pinion 92, through which shaft 91 has vertical play, is mounted on the shaft 91 at a point to engage the gear 93, cut on the lower edge of the drum 58, as shown in Fig. 7. The roller 100 is mounted loosely on a pivoted shaft 101 and receives its motion through the gear-wheel 102, which engages the gear 94, just over the roller 90. (See Fig. 22.) These rollers 90 and 100 have a continuous movement with the drum 58, but are brought into closer mesh with each other when feeding the wire between them in the following manner: The lower end of the shaft 101 is pivoted on the knotter-head, as shown at 102$^a$, and its upper end rests in a sliding plate 103, which in turn is secured to a vertical rod 105 by a connecting-pin 104, the upper end of the vertical rod being pivoted in a lug 106, projecting from the stationary frame. (See Fig. 5.) A horizontal lever 107, pivoted in a bracket 108, extends between the vertical rod 105 and the frame of the knotter. The free end of this lever is turned at right angles to its main portion, as shown at 107$^a$, and projects into a groove 110, formed in the drum 58 just over the gear 92. Located in this groove is a projecting part or cam 111, and as the end of the lever 107, in which is mounted an antifriction-roller 109, passes over the said cam it is forced away from the drum, and its outward movement carries the rod 105 with it, drawing the rollers 90 and 100 into closer mesh or proximity through the instrumentality of the pivoted shaft 101 and the sliding plate 103, heretofore described.

Arranged on the under face of the knotter-head 85 is the loop-shaped groove 112, and fitted to the knotter-head is a shutter or closing-plate 113, which is pivoted on the bolts 114 and 114ª and is designed to close the groove 112 as the wire is fed through it, as hereinafter described. As seen in Figs. 9 and 10, the closing-plate 113 has an upwardly-extending portion 113ª, which is pivoted to a stationary bolt 115, and as the knotter-head is carried downwardly by the mechanism above described the closing-plate is drawn from the position shown in Fig. 10 to the position shown in Fig. 9. When the plate 113 is closed over the groove 112, as just described, a cutting-blade 115ª, secured in said closing-plate 113, cuts the wire extending between the rollers 90 and 100, which rollers are now brought into close proximity in the manner above described, securely holding the end of the wire 6 cut and feeding it through the groove 112. The end of the wire after being fed through the loop-shaped groove is deflected in such a manner as to pass over itself, forming a complete loop, as shown in Figs. 25 and 26, its free end passing between the strands of the first loop formed by the button 54ª of the spindle 54 and extending into an orifice 116, cut in the knotter-head. (See Figs. 25 to 27.) The waste loop has now been cut away and the ends of the wire passing around the bale tied together. As the knotter-head again rises, opening the groove 112, a tapering pin 117 (see Fig. 6) enters the orifice 116, impinging or catching the end of the wire resting in said orifice and holding it until the knot is drawn taut, and at the same time the free end 118 of the first loop is grasped by the automatic pliers, which are arranged to operate in the following manner: A cam-groove 119ª is formed in a plate 119, which is rigidly mounted on the main shaft 41 just under the knotter-frame. Engaging this groove 119ª is a roller 120, which is mounted on the lower end of a pivoted lever 121, a detail of which is shown in Fig. 11. This lever 121 is pivoted to the frame, as shown at 122, and has its upper end connected to the pliers 123 by a pin 124, which is secured in the pliers and projects through the lever 121, as shown in Fig. 12. The operation of the cam, with its operating mechanism just described, is so timed as to feed the pliers, which travel in ways 125, into the knotter just as the knot is completed, whereby the pliers grasp the end 118, as shown in Fig. 27, holding said end until the knot has been drawn taut by the expansive reaction of the compressed bale. By reference to Fig. 12 it will be seen that a stop 126, mounted over the ways 125, engaging inclined parts formed on one of the arms of the pliers, thus permitting the pliers to be easily opened as they travel into engagement with the wire end 118, but securely closing them upon the wire at the end of the stroke and holding it until the knot has been tied and drawn taut by the expansive reaction of the compressed bale, after which the pliers return to their normal position by reason of the cam 119, as just described.

I will now briefly but connectedly describe the operation of the knotter. The initial strand of wire A is carried through the press and secured in the knotter by engaging it with the ratchet-wheel 46 and passing it around the stationary post 46ª. The hay or material to be baled is now being forced into the body of the press and carries the wires A with it and into the position shown in Fig. 29. When sufficient material has been compressed to form a bale, the rod 8 is manipulated by hand, (at the initial stage of the operation,) operating the plunger 35ᶜ, as above described, and forming the strands B B', which are engaged by the ratchet-wheel 46 and posts 46ª, where they are held until each strand has been cut, as above described, the looped portion directly engaged by the ratchet-wheel forming a waste piece to be extracted by the yoke 45, as herein described, and its connections bring the gears 19ᶜ and 20ᶜ into mesh with the segmental gears of the wheel 28 of the transmission mechanism, whereby the shafts 21 and 22 are rotated, the former having a half-revolution the start of the latter. The rotation of the shaft 21 actuates the arms 35ᵉ, carrying the sheaves, whereby the loop of wire B B' (see Fig. 30) is thrust through the press and carried into the knotter. As the completed bale, formed as just described, is ejected from the discharge extremity of the press the trip mechanism is actuated automatically, operating the rod 8 and its connections in the tying of subsequent bales. The loop B B' is caught and held by the ratchet-wheel 46, (see Fig. 13,) and the plunger-arms 35ᶜ are withdrawn from the press during the last half of the revolution of a shaft 21. The movement of the shaft 22 operates the shaft 41, together with the drum 58, whose cam 67, acting on the lever 64, actuates the cutter 61 and cuts the strand B⁵ of the wire, (see Fig. 5,) the strand A⁵ being caught and held by the dog 60. Previously to the cutting operation the looped end of the wire has been raised by the pins 47 into engagement with the wheel 46, the pins being actuated by the lever by virtue of its connection with the cam-groove 57 of the drum, whereby the parts 47, 49, and 51 are thrown to the dotted-line position in Fig. 5. The ratchet-wheel 46 is actuated to raise the toothed end of the wire to the uppermost position (shown in Fig. 13) by virtue of the engagement of the cam 78 of the drum with the rod 74, which acts on the lever 73 to turn the shaft 70 through the instrumentality of the ratchet 71 and the dog 72. Simultaneously with the cutting of the wire at A, or approximately so, the spindle 54 is carried downwardly by virtue of the engagement of its pin 56 with the cam-groove 57, placing its lower extremity in the position indicated in Fig. 23, whereby the projection 54ᵈ engages the wire. When in this position, the spindle is given a half-turn by virtue of the engagement of the pivoted cogged rack or frame 81 with the gear 80, the rack being actuated for this purpose by engagement with the cam-groove 84, formed in the upper extremity of the drum 58. This half-turn of the spindle forms the first loop of the knot. (See Fig. 24.) The knotter-head 85, carrying the wheels 90 and 100, is now moved downwardly by virtue of the engagement of the part 89 of the reciprocating posts 86 and 86ª with the cam-groove 88, whereby the strand A of the wire is made to engage the groove of the wheel 100 in proximity to the milled or roughened part of the wheel 90. The wheel 100 is now thrown toward the wheel 90 through the instrumentality of the rod 105 and its connections, the said rod being actuated by the lever 107, the latter having a part operated by the part 111, located in the groove 110, as heretofore described. This movement of the wheel 100 brings the wire strand A into engagement with the milled or roughened part of the wheel 90, and then the latter is turned by virtue of the engagement of its gear 92 with the gear 93 of the drum. During this operation the wire is fed through the groove 112 of the knotter-head, the said groove having been first closed and the wire strand A⁵ cut (see Fig. 25) by the action of the closing-plate 113, the latter being in turn actuated by the downward thrust of the knotter-head, whereby the wheels 90 and 100 are brought into operative engagement with the wire, as just explained. The wire strand A⁵ is fed through the groove 112 by the action of the wheel 90 until the second loop is formed. (See Fig. 25.) As this loop is completed the extremity of the wire A⁵ is thrust from below into the opening 116 of the knotter-head. The latter is now carried upwardly by the corresponding movement of the parts 86 and 86ª, whose roller 89 engages an upwardly-inclined part of the cam-groove 88. The upward movement of the knotter-head opens the plate 113 and releases the wire loop. Simultaneously, or approximately simultaneously, with this action of the knotter-head the spindle 54 is carried upwardly by the action of the cam-groove 57, and at the same time the said spindle is given a half-revolution in a direction the reverse of its movement when forming the first loop. This reverse movement is accomplished through the instrumentality of the pivoted rack and the cam-groove 84, in which the part 83 of the pivoted frame or rack projects. As the knotter-head moves upwardly, opening the plate 113, the pliers 123 are thrust to the position shown in Fig. 7 and closed on the wire, as at 118. This inward thrust of the pliers is accomplished by the action of the lever 121, operated by the cam-groove of the plate 119. The closing of the pliers is produced by the engagement of the cam part 123ª with the stop 106. One extremity of one wire loop is thus held by the pliers 123, while the extremity of the other loop having entered the opening 116 in the knotter-head is engaged and held by the bevel-faced pin 117, which enters the opening 116 as the knotter-head rises in the manner heretofore explained. These two ends of the wire are held during the tightening operation of the knot, which is accomplished by the movement and expansive reaction of the bale. By the time the knot is tightened the knotter-head has started on its next downward movement and the pliers are opened and returned to their normal position, thus releasing the ends of the knot. When the two wire strands are cut, as heretofore explained, the part of the loop which passes over the sheaves of the plunger-arm 35ᶜ becomes a waste part C, and this is removed from the knotter mechanism by the hooked end 45ª of the yoke 45, the latter being actuated for this purpose by the plunger-arm 35ᶜ. A coil-spring 45ᶜ returns the yoke 45 to the position shown by full lines in Fig. 13 as soon as the plunger-arm 35ᶜ is withdrawn from the knotter. As soon as the knot is tied the bale D is moved to the position shown by dotted lines in Fig. 31 and the knot-tying mechanism begins a repetition of the movements described. It will be seen that the remaining strand B is turned at right angles and becomes the strand A of the succeeding bale, the strands B B' for the following bale being formed by the succeeding stroke of the plunger 35ᶜ, which is operated as each preceding bale is ejected from the press.

Having thus described my invention, what I claim is—

1. In a knotter, the combination with means for introducing a loop of wire or other flexible material to the knotting mechanism, of means for catching and holding the wire loop, means for cutting the wire leaving two free ends, means for forming a loop in one of these wire ends, and means for forming a loop in the other wire end and interlocking it with the first loop to form a knot.

2. In knotting mechanism, the combination with means for introducing the wire or other flexible device in the form of a loop or bend, of means for catching and holding the loop or bend, means for cutting the wire to form a free end, means for forming a loop in this end, means for cutting the wire to form another free end, means for forming a second loop and bringing it into the knotting relation with the first loop, and means for holding the free ends of the two loops until they are drawn into a tight knot.

3. In knotting mechanism, the combination with means for introducing the wire or other flexible device in which the knot is to be made, in the form of a bend, of means for catching and holding the bend, means for cutting the flexible device on opposite sides of the bend to form two free ends, and means for forming loops in the two ends of the flexible device and bringing the said loops into the knotting relation.

4. In a knotter, the combination with a framework and means for introducing a wire thereto in the form of a bend, of means for catching and holding the wire bend, means for cutting the loop on one side of the bend, means for forming a loop in one end of the wire, means for cutting the wire on the other side of the bend, means for forming a second loop at the end last cut, and means for bringing the two loops into relation to form the members of a knot.

5. In a knotter, the combination of means for introducing the wire or other flexible device in which the knot is to be made, in the form of a bend, means for cutting the wire on one side of the bend, means for forming a loop in one of the cut ends, means for cutting the wire on the other side of the bend, means for forming a loop in another wire end and bringing the two loops into the knotting relation, and means for removing from the device, the waste wire part between the two cutting-points.

6. In a knotter, the combination of means for cutting a flexible device on opposite sides of a bend therein, and means for forming loops in the parts of the device severed from the bend and bringing the said loops into the proper relation to form knot members.

7. In a knotter, the combination of cutting devices arranged to cut a flexible device on opposite sides of a bend in the last-named device, whereby a waste part is left at the bend, means for removing the waste part, and two distinct devices for forming loops in the respective parts of the flexible device cut from the bend, and means for bringing the two loop members into proper relation to form a knot.

8. In a knotter, the combination with means for forming a bend in the flexible device, of means for automatically cutting the wire on opposite sides of the bend leaving a waste part, and means for automatically forming loops in the two wire ends cut from the waste part and bringing the two loops into proper relation to form a knot in the severed wire ends.

9. In a knotter, the combination with means for introducing a wire or other flexible device in the form of a bend or loop to the knotter mechanism, of a revoluble spindle for forming a loop in the wire part on one side of the bend, a guide for the wire part on the other side of the bend, means for automatically feeding the last-named wire part through its guide forming a loop coöperating with the first loop to form a knot, and means for automatically operating the loop-forming devices.

10. In knotting mechanism, the combination of a reciprocating, revoluble spindle, means for automatically operating the spindle to cause it to form a loop in one strand of the device to be tied, a loop-shaped guide for the other strand, and automatically-operated means for feeding the last-named strand through said guide whereby it is brought into proper relation with the first loop to form a knot.

11. In a knotter, the combination of a spindle mounted to rotate and reciprocate and having one extremity fashioned to receive a strand of the wire or other flexible device in which the knot is to be formed, means for automatically actuating said spindle whereby it is moved to engagement with the wire and made to turn to form a loop therein, and means for forming a coöperating knot-loop in another wire strand and bringing the two loops into the proper knotting relation.

12. In a knotter, the combination of means for forming a loop in a strand of wire or other flexible device in which the knot is to be formed, a part having a loop-shaped guide-groove for the other wire strand, a movable part for closing said guide-groove, and means for automatically feeding the wire strand through said guide-groove, the arrangement being such that the two loops are brought into proper relation to form knot members.

13. In a knotter, the combination of a spindle mounted to rotate, having a tapered end and a wire-bending lip, means for automatically operating the spindle to form a loop in the wire strand or other flexible device in which the knot is to be formed, a part having a loop-shaped guide, and means for automatically feeding the other strand of wire through said guide, the arrangement being such that the two loops are thereby brought into the knot-tying relation.

14. The combination of means for forming a loop in a strand of wire or other flexible device, a part having a loop-shaped guide, and wheels for automatically feeding the wire through said guide whereby the two loops are brought into proper relation to form a knot.

15. In a knotter, the combination of means for automatically forming a loop in a wire strand, a loop-shaped guide for the other wire strand, two wheels arranged to receive the last-named strand of wire, the two wheels being geared together, and means for actuating the wheels whereby the wire is fed through the groove and whereby the two loops are brought into the interlocking, knot-tying relation.

16. The combination of means for forming a loop in a wire strand, a loop-shaped guide for receiving the other wire strand, two wheels arranged in suitable proximity to receive the wire, means for tightening the wheels on the wire to produce a suitable feed tension, and means for rotating the wheels whereby a wire strand is fed through the guide to bring the two wire strands into suitable coöperating, knot-tying relation.

17. The combination with two wire strands, of means for forming a loop in one strand, two spindles, wheels mounted thereon, one spindle and its wheel being revoluble, the other wheel being loose on its spindle, gears connecting the two wheels, one spindle being pivoted to bring the two wheels into proper tension for feeding the wire strand, a loop-shaped guide for the wire strand, and means for actuating the wheels whereby the wire strand is fed through the guide to coöperate with the other loop to form a knot.

18. In a knotter, the combination of a rotary drum, a reciprocating spindle actuated by said drum for forming a loop in a wire strand, a loop-shaped guide for another strand, means for closing said guide, and means actuated from the drum for feeding the wire through the said guide to form a loop and bring it into operative, knot-tying relation with the first-named loop.

19. In a knotter, the combination of a rotary drum, means automatically actuated from the drum for forming a loop, and distinct means operated from the drum for forming another loop and bringing it into coöperating knot-tying relation with the first-named loop.

20. The combination of a rotary drum provided with cams and a gear, a spindle actuated from the cams of the drum for imparting a reciprocating and rotary movement to the spindle whereby a loop is formed in one wire strand or other flexible knot-tying device, a loop-shaped groove for another wire strand, wheels arranged to receive this strand between their peripheries, and means operated from the drum for imparting a rotary and reciprocating movement to the wheels whereby the last-named wire strand is engaged by and fed through the guide to form a loop and bring it into coöperating knot-tying relation with the first-named loop.

21. The combination of a rotary drum, and means automatically operated from the drum for forming two distinct wire loops and bringing them into the coöperating knot-tying relation.

22. The combination of a rotary drum, means for cutting the wire on opposite sides of a bend, and means for forming the wire parts on opposite sides of the bend into loops and connecting them in coöperating knot-tying relation, the said wire-cutting, wire-looping and wire-connecting devices being automatically actuated from the rotary drum.

23. In a knotter, the combination of a spindle mounted to rotate and reciprocate whereby it is made to engage a wire and form a loop; a loop-shaped guide-groove plate, a plate for closing said groove, means for feeding another wire strand through the guide-groove to form a loop, and means for bringing the two loops into interlocking, knot-tying relation.

24. In a knotter, the combination of means for introducing a wire or other flexible device in the form of a bend to the knotting mechanism, of means for catching and holding the bend, means for cutting the flexible device on opposite sides of the bend, means for forming two loops in the free ends formed by cutting the flexible device, means for interlocking the said loops, and means for holding the ends of the two loops until the latter are drawn sufficiently tight to make a secure knot.

25. The combination of means for introducing the wire to the knot-tying mechanism and forming a bend therein, means for raising the wire bend, means for catching and holding said bend, means for cutting the wire on opposite sides of the bend, means for removing the waste wire at the bend, means for forming two distinct loops in the wire strands, means for interlocking the two loops, and means for holding the wire extremities of the interlocking loops whereby the latter are drawn sufficiently tight to form a secure knot.

26. In a knotter, the combination of means for introducing the wire to the knotting mechanism, a ratchet-wheel for holding the wire, a knife for cutting the wire on one side of the wheel, a device for cutting the wire on the opposite side of the wheel, means automatically actuated for forming two distinct loops in the two wire strands, and means for interlocking the same to form a knot.

27. In a knotter, the combination with means for holding two wire strands, a spindle provided with a gear, a swinging rack for operating said spindle whereby one of the wire strands is formed into a loop, means for reciprocating the spindle whereby it is moved into and out of contact with the wire, a plate having a guide-groove, a movable plate for closing said groove, wheels for feeding the other wire strand through the guide-groove to form a loop, and means for connecting the two loops in interlocking relation.

28. The combination of means for looping and tying two wire strands, and a rotary drum for automatically actuating said means.

29. The combination of a reciprocating knotter-head, means mounted thereon for engaging a wire strand and forming it into a loop, a reciprocating, rotary spindle for forming a loop in another wire strand, and means for interlocking the two loops to form a knot.

30. The combination with a rotary drum, of mechanism actuated from said drum for forming two loops in the wire strands, and connecting them in interlocking knot-tying relation.

31. The combination of a rotary drum, means for introducing the wire to be tied and forming a bend therein, means for holding the wire bend in place, means for cutting the wire, and means for looping the two wire parts on opposite sides of the bend and connecting them in interlocking relation, the holding, cutting and looping means being automatically actuated from the rotary drum.

32. In a knotter, the combination of means for holding a flexible device introduced to the mechanism in the form of a bend, means for cutting the flexible device on one side of the bend, means for forming a loop in the free end of the flexible device resulting from the cut, means for cutting the flexible device on the other side of the bend, means for forming a loop in the free end of the flexible device last cut, and means for bringing the two loop members into the knotting relation.

33. The combination with knotting mechanism, of a plunger for carrying a wire loop into the knotter, a transmission-gear for operating the wire-carrying plunger, a trip actuated by the tied packages for controlling the action of the transmission-gear in its relation with said plunger, and a suitable connection between the transmission-gear and the knotting mechanism whereby the latter is actuated at predetermined intervals through the instrumentality of the trip mechanism.

34. The combination with a baling-press, of a knotter mounted thereon in suitable proximity thereto, an arm mounted on the press and adapted to carry a loop of wire across the press into the knotter, power-transmission mechanism normally disconnected from the knotter and wire-carrying plunger, a trip mechanism acted on by the completed bales for automatically connecting the knotter and the wire-carrying devices with the transmission mechanism.

35. The combination with a baling-press, of a knotter device mounted thereon, a wire-carrying plunger also mounted on the press, a power-transmission device normally disconnected from the knotter mechanism and the wire-carrying plunger, trip mechanism actuated by the completed bales, a connection between the trip mechanism and the power-transmission mechanism, the knotter and the wire-carrying plunger, whereby motion is automatically communicated to the knotter and wire-carrying devices.

36. The combination with a baling-press, of a knotter, a power-transmission device, trip mechanism actuated by the completed bales, a rod connected at one extremity with the trip mechanism, an adjustable gear connected with the said rod and the knotter mechanism and arranged to be brought into operative relation with the power-transmission device as the trip mechanism is actuated.

37. The combination with a baling-press, of knotter mechanism, gearing connected therewith, a power-transmission device having a gear normally disconnected from the knotter-gearing, a trip mechanism mounted at the discharge extremity of the press and connected with the knotter-gearing for bringing the latter into operative relation with the power-transmission gear as the bales are discharged from the press.

38. The combination with a baling-press, of knotter mechanism, means for carrying the wire across the press to the knotter, a transmission device having gears, adjustable gears connected with the knotter mechanism and with the wire-carrying mechanism, and normally disconnected from the gears of the transmission device, a trip mechanism actuated by the completed bales as they leave the press, and connected with the adjustable gears for actuating the same to bring them into operative engagement with the gears of the transmission device.

In testimony whereof I affix my signature in presence of two witnesses.

LEWIS B. WYGANT.

Witnesses:
DENA NELSON,
IDA E. O'BRIEN.